Aug. 10, 1948.  H. E. ROSE  2,446,611
HYDRAULIC WINDSHIELD WIPER
Filed Nov. 30, 1942  5 Sheets-Sheet 3
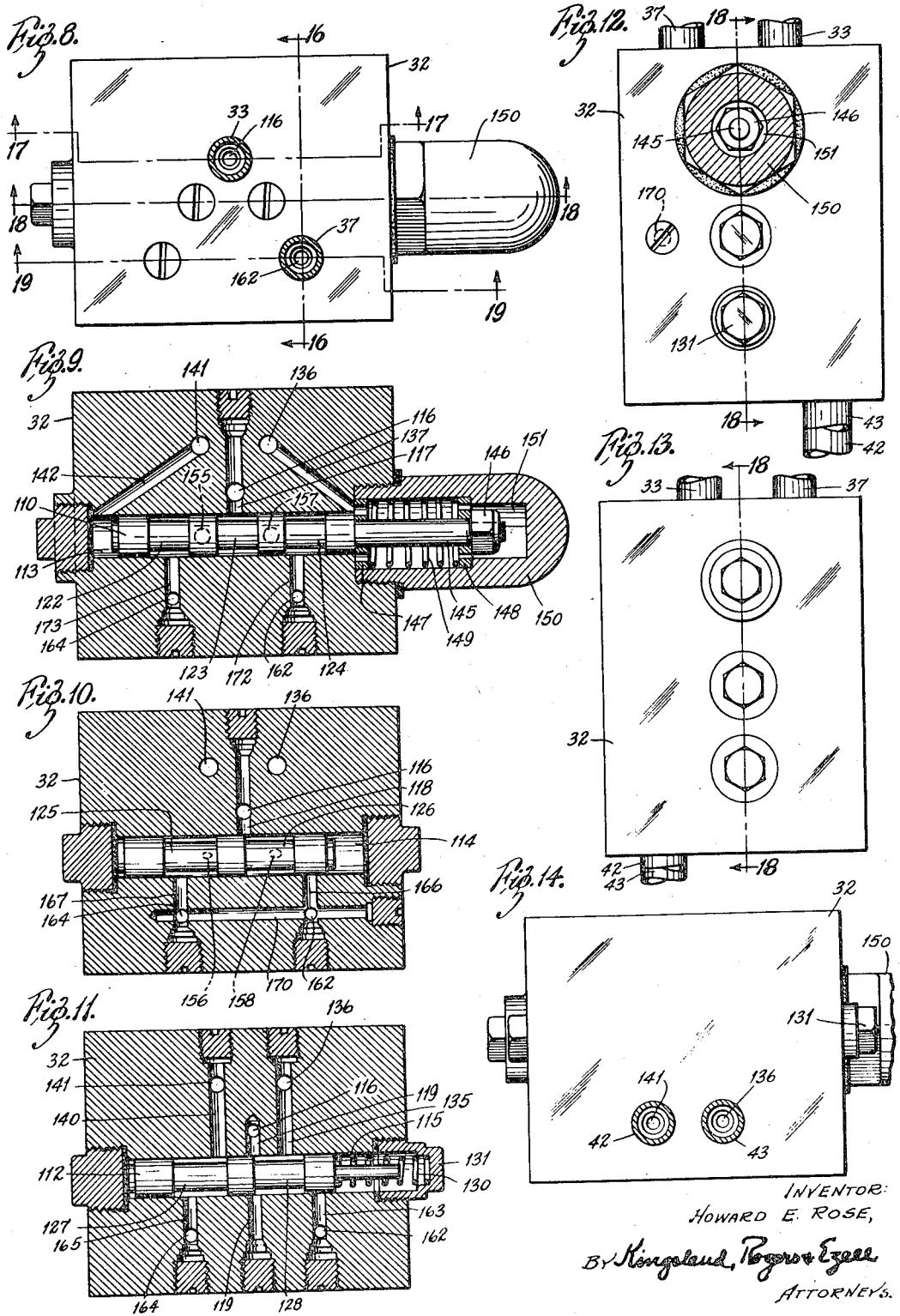
INVENTOR:
HOWARD E. ROSE,
By Kingsland, Rogers & Ezell
ATTORNEYS.

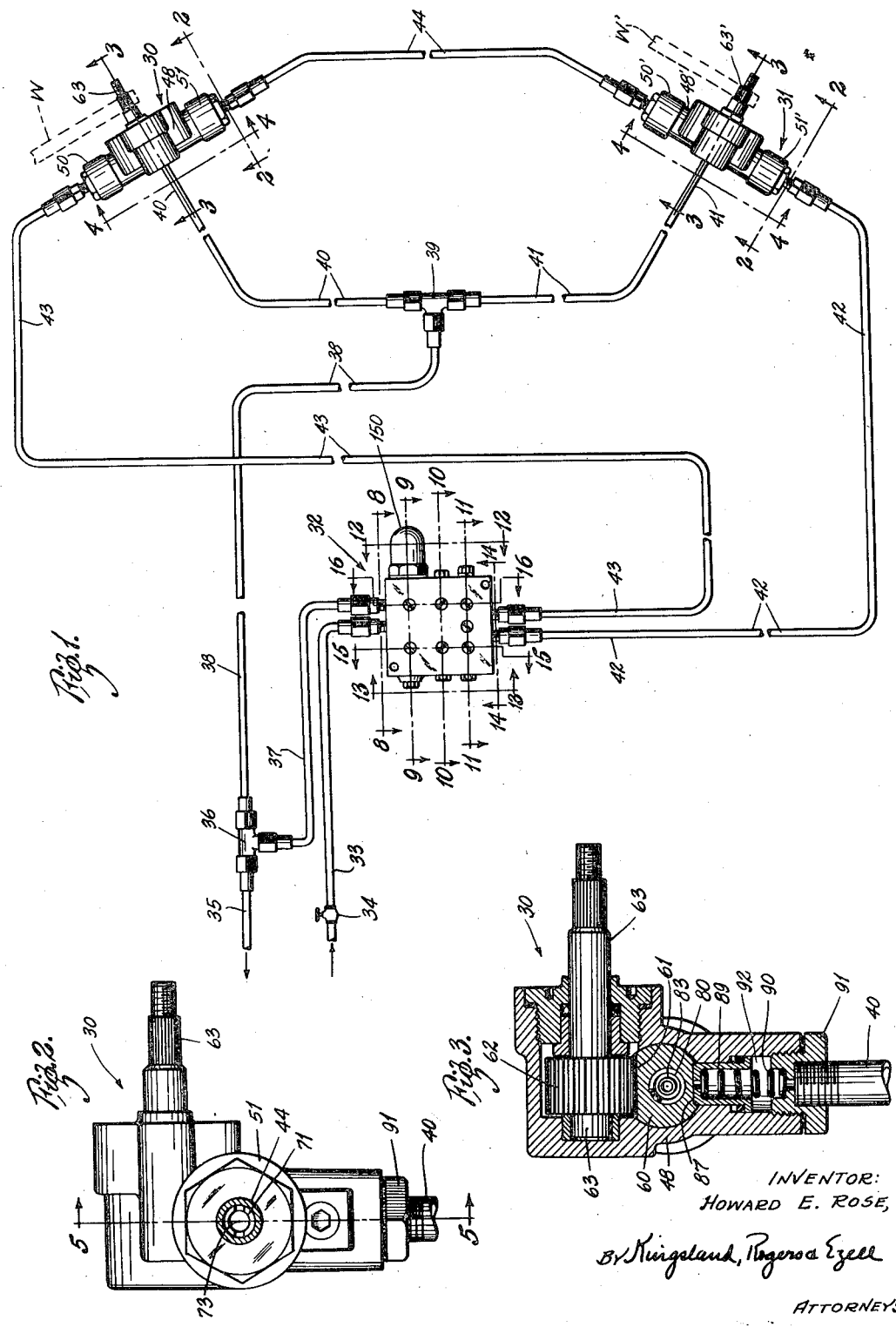

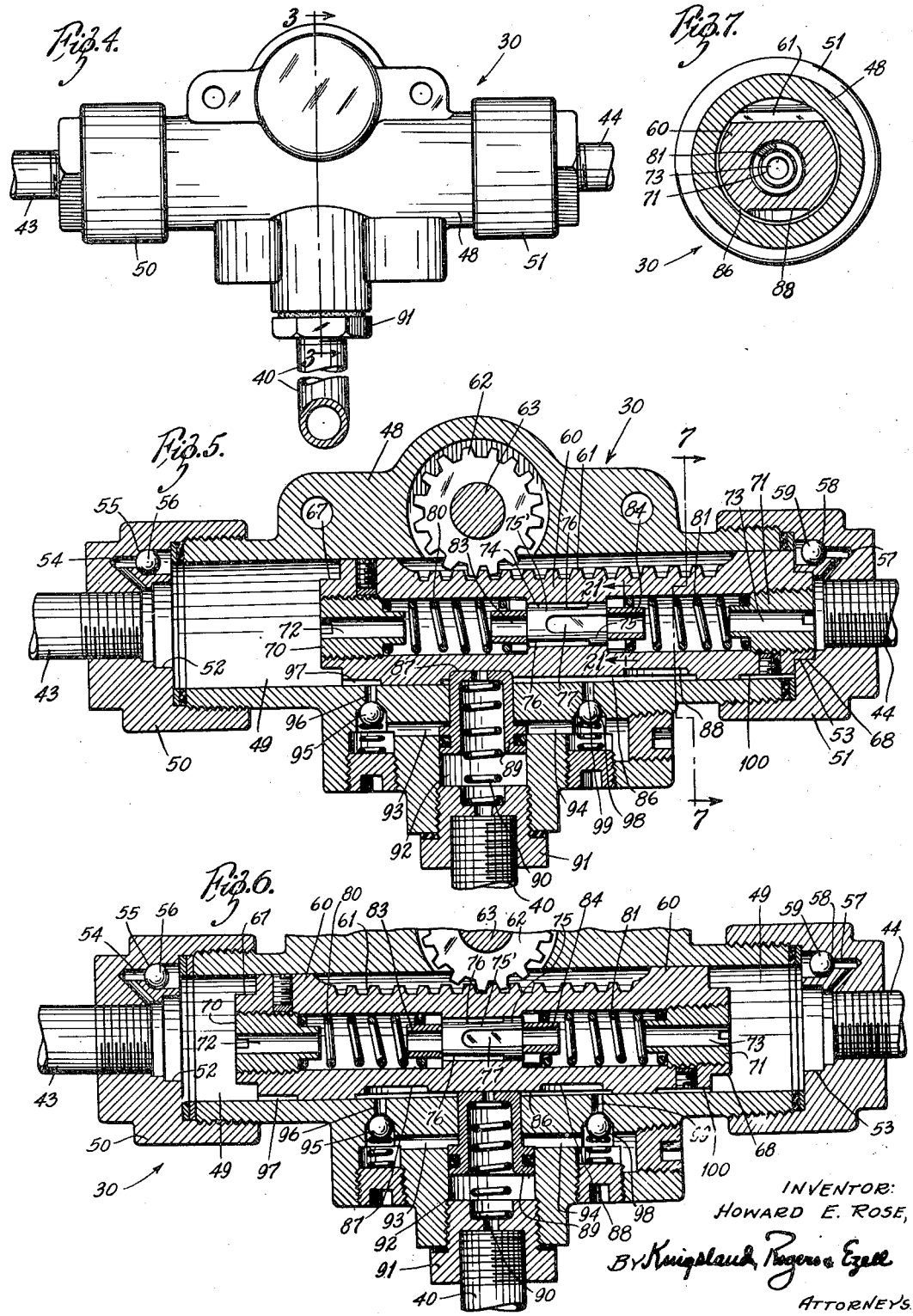

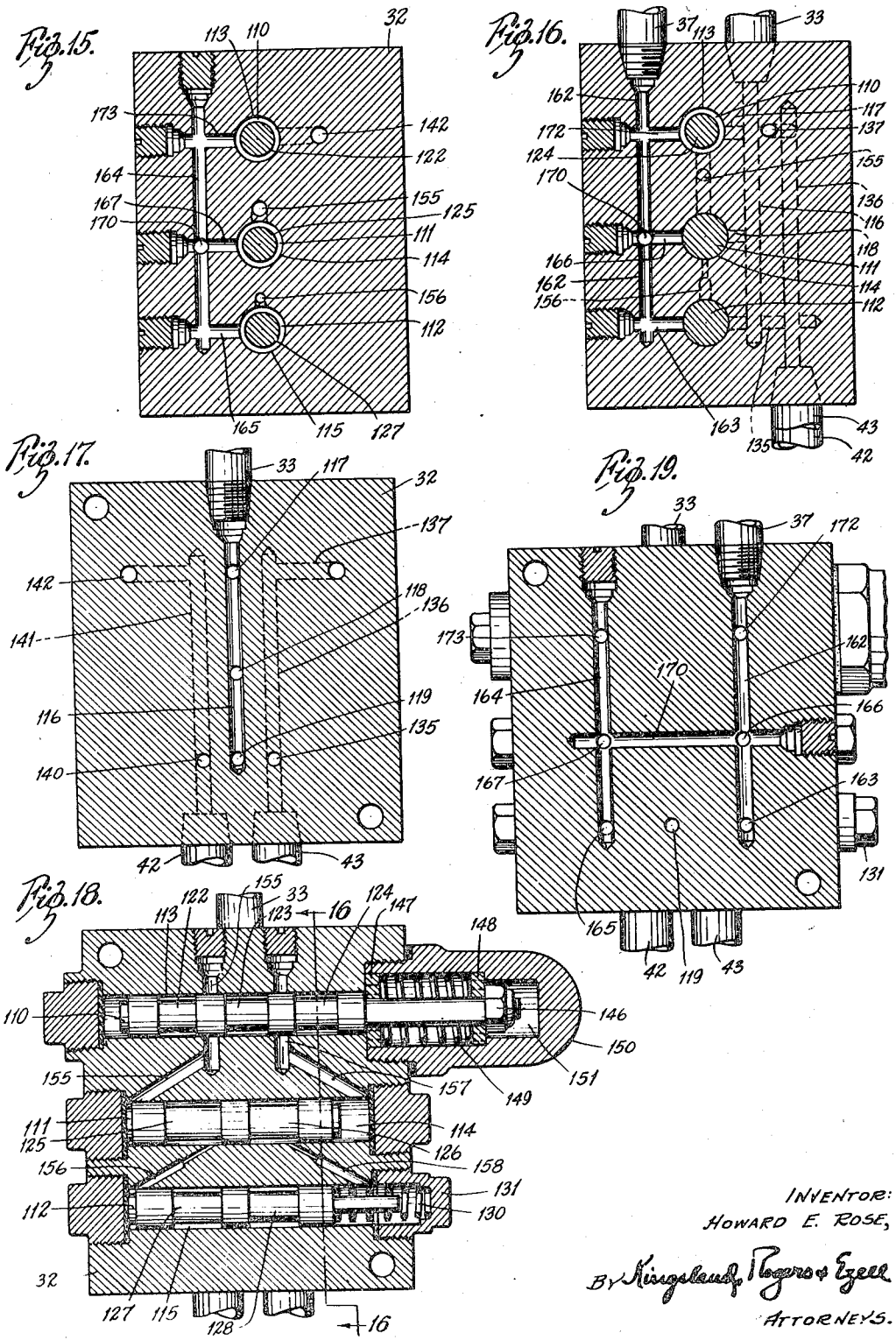

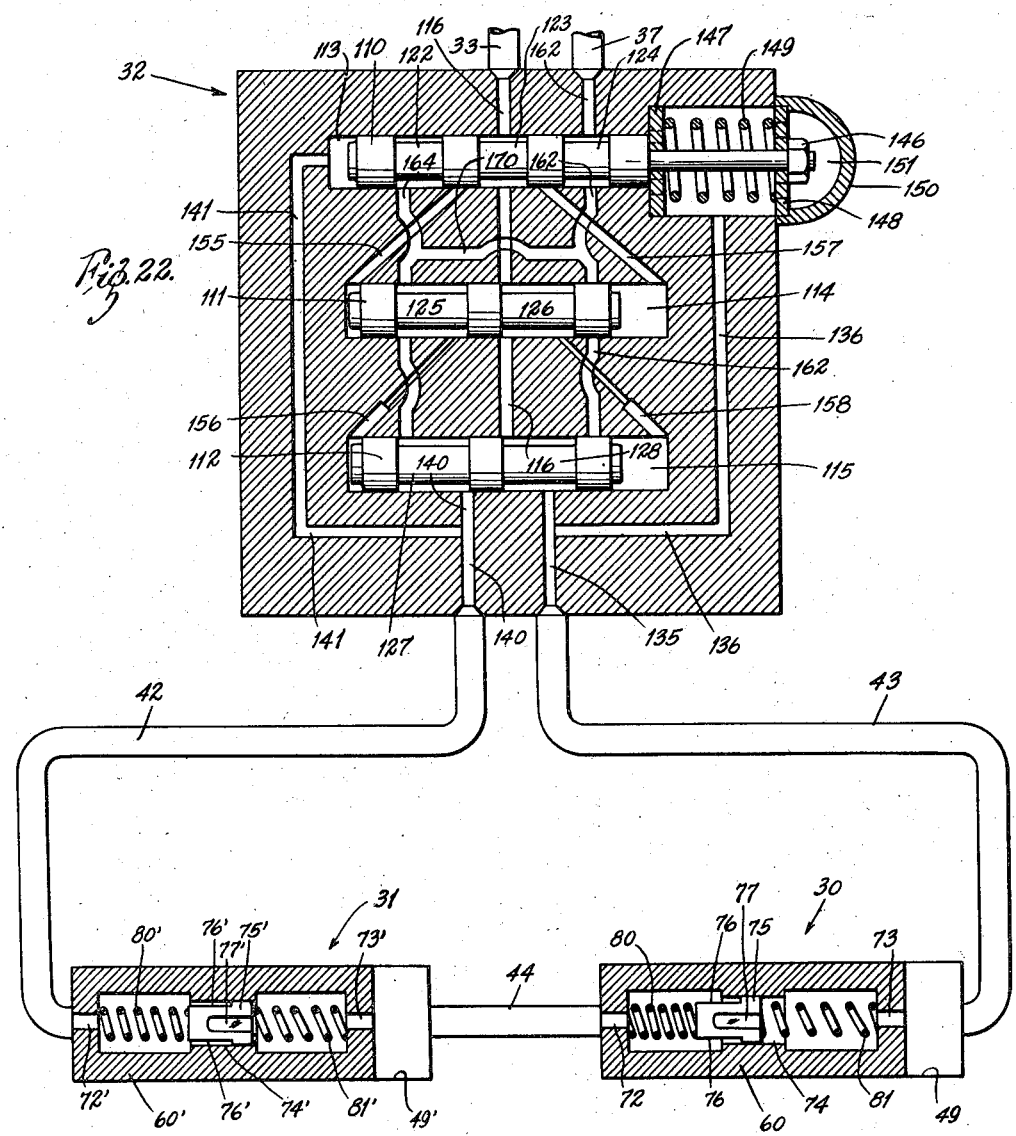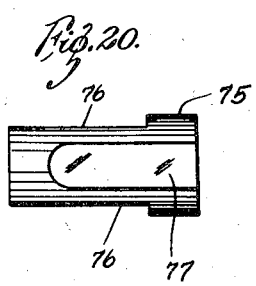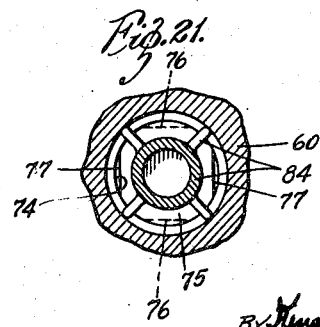

Patented Aug. 10, 1948

2,446,611

UNITED STATES PATENT OFFICE 2,446,611

HYDRAULIC WINDSHIELD WIPER

Howard E. Rose, Normandy, Mo., assignor, by mesne assignments, to Kearfott Company, Inc., New York, N. Y., a corporation of New York Application November 30, 1942, Serial No. 467,359

23 Claims. (Cl. 15—253)

1

The present invention relates to hydraulic windshield wipers.

In general, it comprises one or more operating units, a control valve adapted to be connected to a source of hydraulic flow and a return thereto. The valve is one that is reversing, so that the wipers are operated first in one direction and then in the other.

An object of the invention is to provide a mechanism of this kind in which a cut-off valve may be used and which relieves the entire system from pressure when the mechanism is stopped.

A further object is to provide a mechanism of this kind in which each blade of the wiper may be installed without interfering with the operation of the other blade. It is also an object to provide synchronization of the blades so that they operate together, and to provide resynchronization in case one or more of them is blocked to destroy synchronization temporarily.

A further object is to provide a mechanism of this kind in which reversal may occur without completion of the stroke. In this connection, a further object is to provide a mechanism in which both blades will operate even though one is limited in its stroke.

A further object is to provide a mechanism of this kind embodying a plurality of blades which may wipe in the same or in opposite directions.

A further object is to provide a mechanism in which the several units may be disposed in any desired relationship and operated through a connection of any length or shape.

A further object is to provide a mechanical locking mechanism, automatically released, for holding the blades in an end position when inoperative.

An overall object is to provide a pressure-responsive windshield wiper mechanism in which various elements of the cycle are determined by fluid pressure in the system.

In the drawings:

Fig. 1 is an overall view of the mechanism as it would be connected to a typical installation;

Fig. 2 is an end view of one of the windshield units as on the line 2—2 of Fig. 1;

Fig. 3 is a medial section of one of the windshield units taken on the line 3—3 of Fig. 1;

Fig. 4 is a rear elevation of one of the windshield units taken on the line 4—4 of Fig. 1;

Fig. 5 is a medial longitudinal section of one of the windshield units taken on the line 5—5 of Fig. 2;

Fig. 6 is a view similar to Fig. 5, but with the operating piston shown in a different position;

2

Fig. 7 is a transverse section through one of the windshield units taken on the line 7—7 of Fig. 5;

Fig. 8 is a plan view of the operating control valve, or motive unit as it appears in Fig. 1 and taken on the line 8—8 thereof;

Fig. 9 is a section through the control valve taken on the line 9—9 of Fig. 1;

Fig. 10 is a section through the control valve taken on the line 10—10 of Fig. 1;

Fig. 11 is a section through the control valve taken on the line 11—11 of Fig. 1;

Fig. 12 is a vertical view from the right-hand side of the control unit in Fig. 1 taken on the line 12—12 thereof;

Fig. 13 is a vertical view of the control valve looking from the left-hand side of Fig. 1 on the line 13—13 thereof;

Fig. 14 is a bottom view of the control valve taken on the line 14—14 of Fig. 1;

Fig. 15 is a vertical section through the control valve taken on the line 15—15 of Fig. 1 on the left-hand side thereof;

Fig. 16 is a vertical section through the control valve at the right-hand side thereof on the line 16—16 of Fig. 1;

Fig. 17 is a vertical section through the control valve taken on the line 17—17 of Fig. 8;

Fig. 18 is a medial vertical section through the control valve taken on the line 18—18 of Fig. 8;

Fig. 19 is a section through the control valve taken on the line 19—19 of Fig. 8;

Fig. 20 is an enlarged view of one of the wiper unit slide valves;

Fig. 21 is a section on the line 21—21 of Fig. 5; and,

Fig. 22 is a diagram showing the connections to illustrate the operation.

In the description of the drawings, certain views have been described as vertical sections or horizontal sections for convenience, since it is not intended to limit the positioning of the mechanism.

In general, the mechanism comprises one or more windshield units, two being here shown at 30 and 31. The mechanism also includes a motive unit or control valve 32. A line 33 is connected to a hydraulic pressure line through an adjustable cut-off or speed control valve 34. A return line 35 is likewise connected to the hydraulic system. This return line runs to a T 36 from which one branch 37 is connected into the control valve 32, and the other branch 38 extends to another T 39 from which the branches 40 and 41 are connected into the windshield units 30 and 31, respectively.

Two lines 42 and 43 lead from the control valve 32 to the wiper units 30 and 31, respectively. The two lines 42 and 43 are alternatively pressure and exhaust lines. The two units 30 and 31 are connected by a line 44.

The windshield units are identical, and Figs. 2 to 5 may be either one of them. For convenience in the following description, it will be assumed that Fig. 5 represents the wiper unit 30. This unit includes a housing 48 through which extends a cylinder 49. A head 50 is attached to one end and a head 51 to the other end. The head 50 receives the line 43 and the head 51 receives the line 44 so that the two lines 43 and 44 are put into communication with opposite ends of the cylinder. The cylinder head 50 has a reduced circular cut-out 52 in it and a similar cut-out 53 is found in the head 51. A small port 54 in the cylinder head 50 terminates in a valve seat 55 that receives a ball valve 56. This ball valve constitutes a check valve as will appear. In the head 51, there are a similar port 57, a seat 58, and a ball valve 59.

Reciprocable within the cylinder 49 is a piston 60. This piston has a rack 61 on its upper surface that engages with a gear 62 mounted on a shaft 63 to drive the windshield wiper W back and forth.

The piston is symmetrical about its center transverse section. At one end, it is cut away to provide a small head portion 67 having a loose fit with the cut-out 52 in the head 50. A corresponding portion 68 cooperates with the cut-out 53 in the head 51.

The cylinder has an opening running from one end to the other thereof. This opening is threaded at each end to receive plugs 70 and 71. These plugs are ported at 72 and 73, respectively. The piston opening at its middle portion has a reduced portion 74 to receive a slide valve 75. The valve 75 is not ported, but from its left hand in Fig. 5, it has two opposite flats 76 extending more than half the distance across the reduced part 74 of the piston. At right angles to the flats 76 are similar flats 77 extending from the right-hand end of the piston. See Fig. 20.

Springs 80 and 81 act against the two plugs 70 and 71. At their inner ends, these springs bear against spiders 83 and 84 engaging against the ends of the reduced portions 74. These spiders admit oil freely past them and into the flats 76 and 77. The spiders 83 and 84 shoulder in the piston and thus locate the valve in a central position.

The piston 60 is provided with a relief groove 86, into which are disposed two notches 87 and 88 on its lower side. These are adapted to be engaged by a cup-like plunger 89, and, as will appear, will retain the wipers in their rest positions. The plunger 89 is urged into engaging position by a spring 90 abutting against a fitting 91 that receives the exhaust line 40. The piston 89 operates within a cylindrical opening 92 in the housing 48.

The upper portion of the cylinder 92 is connected with two lines 93 and 94. Line 93 leads to a ball-type check valve 95, from which a port 96 extends for communication with the left end of the main cylinder 49 of the mechanism. This communication is limited to such times as a notch 97 in the piston 60 registers with the port 96. Similarly, the port 94 communicates with the ball-type check valve 98 opening into a port 99 that may register with a notch 100 in the other end of the piston.

During operation, when hydraulic fluid is admitted through the line 44, it will create a pressure against the right-hand end of the piston, displacing the piston until it is stopped either at the end of its normal stroke or prior thereto. After such stopping of the piston, the pressure will build up against the right-hand end of the valve 75 and displace it or not, depending upon the other wiper's position. As the pressure builds up through the notch 100, it will flow past the ball-type check valve and maintain the locking piston 89 down against the spring 90. Upon a subsequent reversal of the oil flow, while under pressure, it will be introduced through the line 43 and the notch 97 and maintain the piston back in the same manner.

The control valve or wiper motive unit 32 is connected with the pressure intake line 33 and the exhaust line 37. The control 32 comprises three valves within the housing (Fig. 18). They are the selector valve 110, the pilot valve 111, and the directional valve 112. These three valves operate within cylinders 113, 114, and 115, respectively.

The pressure line 33 communicates with a port 116 that extends downward through the housing to the level of the cylinder 115.

The port 116 communicates with the cylinder 113 through a cross port 117. It communicates with the cylinder 114 through a cross port 118 (Fig. 10). It communicates with the cylinder 115 through a cross port 119 (Fig. 11). For convenience in manufacture, the ports 117 and 118 are drilled in from the back of the housing, whereas the port 119 is drilled in from the front of the housing.

It will be seen, therefore, that pressure is at all times supplied to the several cylinders.

The valve 110 has three reduced sections 122, 123, and 124, the sections being divided by suitable enlargements on the valve that seal with the cylinder walls. The port 117 leads into the section 123 of the valve which, in the positions of Figs. 9 and 18, has no outlet.

The fluid under pressure through the portion 118 (Fig. 16) leads into the cylinder 114 under control of the valve 111. This valve has two reduced sections 125 and 126 separated by enlarged sections sealing with the cylinder walls.

The pressure through the line 119 (Fig. 11) leads to the cylinder 115 where it is under control of the valve 112. This valve has two reduced sections 127 and 128 separated by enlarged portions sealing with the cylinder walls.

The directional valve 112 is normally urged to one extreme position by a light coil spring 130 headed by a cap 131. This is provided to insure against the mechanism stopping on a dead center position.

From the cylinder 115 of the valve 112 (Fig. 11), there extends a port 135 leading backwardly to a vertical port 136. The port 136 (Fig. 9) connects by a horizontal port 137 with a pressure chamber at the right-hand end of the selector valve 110.

Similarly (Fig. 11), the cylinder 115 on the left of its midsection has a horizontal port 140 leading to a vertical port 141 that communicates with a horizontal port 142 (Fig. 9) leading to the opposite end of the valve 110.

The valve 110 is designed to rest in a neutral position, which position is shown in Figs. 9, 18, and 21. To produce this, the valve 110 has an extension 145 at one end, having a nut 146 threaded thereon. The extension 145 at its opposite ends has ported washers 147 and 148 between which is a spring 149. This spring 149 normally urges the washers as far apart as they are permitted to go, which, as will be seen, puts the valve in the neutral position from which it may move in either direction. A cap 150 covers the extension and the spring and washers and has a chamber 151 within it to receive fluid pressure. It will be seen that the fluid pressure from the port 137 can pass into the chamber 151 as well as the chamber around the spring 149, and may act to displace the valve to the left in Fig. 9. Similarly, pressure through the ports 141 and 142 may act against the other end of the valve 110 to displace it to the right. Upon relief of such pressures, the valve will return to its neutral position under the action of the spring 149. The port 136 (Fig. 17) is likewise connected to the line 43 and the port 141 is connected to the line 42.

It may be seen from the foregoing, that when oil under pressure flows through the line 33, through the port 118 and the port 119 to the valve space 128 of the directional valve 112, it may then flow through the port 135 to the port 136. From the port 136, it flows downwardly through the line 43 to the windshield units and upwardly to the port 137, whence it may displace the selector valve 110 to the left in the views, under conditions to be described. This last action puts the pressure port 117 into communication with a port 155 (Fig. 18) leading to the left end to the pilot valve 111. This pressure will displace the pilot valve 111 to the right in Fig. 18, which will cause the reduced portion 125 of that valve to bring the pressure port 118 (Figs. 10 and 18) into communication with a port 156 leading to the left of the directional valve 112. The port 156 is restricted so as to delay this last action and, therefore, to delay displacement of the directional valve 112 to the right.

A corresponding port 157 (Fig. 18) leads from the valve 110 to the right-hand end of the valve 111 and a restricted port 158 leads from the valve 111 to the right-hand end of the valve 112.

In order to exhaust the several ports and chambers, the exhaust line 37 communicates with a port 162 passing vertically down in front of the valve (Fig. 16). The port 162 at its bottom (Figs. 11 and 16) communicates with a port 163 leading to the cylinder 115 of the valve 112 in such wise that when the valve 112 is to the right, the portion 128 will put the port 135 in communication with the port 163 and out of communication with the pressure port 119.

There is a corresponding exhaust port 164 extending down the other side of the front of the valve. It has a corresponding cross port 165 leading into the other end of the cylinder 115 of the valve 112.

Similarly (Figs. 10 and 18), the port 162 communicates with the cylinder 114 through a port 166; and the port 164 likewise communicates with this cylinder through a cross port 167 (Fig. 10). As shown in Fig. 10, the portion 125 of the pilot valve 111 may produce registry between the port 156 through which the fluid operates the directional valve 112, and the port 167. Similarly, opposite placing of the valve 111 will cause registry between the port 158 and the port 166.

The two ports 162 and 164 are put into communication through a cross port 170 that is here shown as being disposed at the level of Fig. 10.

Likewise, in Fig. 9, the port 162 communicates through a port 172 with the cylinder 113 of the selector valve 110; and the port 164 communicates therewith through a port 173. It will be seen that when the selector valve is moved from the left of its neutral position, ports 172 and 157 are brought into registry; and when the valve 110 moves to the right, the ports 155 and 173 are brought into registry.

Operation

First, the operation of the control valve will be set forth, for which purpose reference is made to the diagrammatic showing of Fig. 22. Assuming that the several valves are in the positions of Fig. 22, and that the main speed control valve 34 (Fig. 1) is open, oil under pressure will flow through the tube 33 and the port 116 of the control valve. From the port 116, it will flow to the space 123 of the valve 110. This will have no effect because it is balanced and no outlet ports are open, the valve 110 being in its neutral position. Likewise, it will flow from the port 116 into the space 126 with the valve 111 in the position shown. From the space 126, it will flow through the restricted port 158 into the right-hand end of the cylinder 115 to maintain the valve 112 to the left. This has no immediate effect because the valve is already in such position.

The oil from the port 116 will likewise flow through the port 119 (Fig. 11) where it is admitted to the space 128 by the valve 112, as the latter is in its left-hand position. From the space 128, it flows out the port 135 to the tube 43 and to the wiper elements to operate them as will be described. It, likewise, flows upwardly in the port 136 to the right end of the cylinder 113 until it attains sufficient pressure to displace that valve to its left-hand position. The spring 149 will prevent displacement of the valve 110 until the line 43 has become filled with oil, and a pressure is built up in the line 43, as will appear.

It will be seen from the foregoing that a pressure is supplied to the line 43 by the foregoing operation. It will now be shown how the valve reverses itself.

When the valve 110 is moved to the left, it opens the line 116 to the port 155 through the space 123. Thereupon, pressure flows readily through the port 155 to dislodge the valve 111 to the right. At the same time, the oil at the opposite end of the cylinder 114 may move backwardly through the port 157, which, now through the space 124, exhausts into the port 162 through the space 124 and the exhaust tube 37. Thus, the application of pressure to one end of the valve 111 and the relief of pressure at the other end is simultaneous.

As soon as the valve 111 is displaced to the right, the port 116 is put into communication with the restricted port 156 which causes the directional valve 112 to begin the move to the right. At the same time, the port 158 is put into communication with the exhaust port 162 through the space 126 on the valve 111.

As the described action of the valve 112 occurs, the pressure inlet port 116 is shifted from the space 128 to the space 127; and through the space 127, oil under pressure flows to the port 140, thus applying pressure to the tube 42 that leads to the windshield units, and to the passage 141. At the same time, the line 43 and the port 136 are connected to exhaust line 162 through the space 128 of the valve 112, so that the tube 43 and the right-hand end of the cylinder 113 may now be relieved of pressure through this connection.

As soon as the right-hand end of the valve 110 is relieved of its pressure, the selector valve 110 returns at once to its neutral position; and thereby it locks the valve 111 in the position previously assumed, because both of the ports 155 and 157 are cut off when the valve 110 is in neutral position. The spring pressure produced upon the selector valve 110 is greater than the normal unit operating pressure of the valve and the mechanism. Thus, as previously noted, the selector valve 110 will not shift beyond its neutral position until resistance has been built up in whichever of tubes 42 and 43 is the pressure line, and the pressure thereby admitted to one of the other ends of the valve 110 exceeds the setting of the spring 149. The delay through the restricted passages 156 and 158 insures that the valve 111 will have moved its full stroke before the valve 112 may move so far as to relieve the pressure holding the valve 110. Thus, before the valve 110 returns to neutral position, the valve 111 will be all the way over, insuring admission of pressure to the valve 112 regardless of a return of the valve 110 to neutral position. This eliminates the necessity of a mechanical snap action on the valve 112.

Upon the application of pressure to the port 141 and the tube 42 to reverse the wiper mechanisms, when a predetermined resistance is reached in the tube 42 and the port 141, this pressure acting through the port 142 (Fig. 9) will act to reverse the selector valve 110 and thus reverse the cycle previously given.

From the foregoing, it may be seen that the tubes 42 and 43 alternately become pressure and relief lines. It will further be seen that, if either one is a pressure line, it will remain so until the pressure within it attains and exceeds the predetermined value, when a reversal will occur. This insures that pressure will be maintained to the end of the stroke of the windshield wipers because, as will be shown, under normal operating conditions only then can the pressure build up in the pressure line to exceed minimum required for shifting the valve 110. This valve, therefore, is pressure-responsive and cooperates with pressure conditions in the wiper units themselves.

The action of the windshield wiper units will now be described.

In Fig. 22, which shows diagrammatically the two operating mechanism (omitting the bleed lines and locker), the unit 30 has applied to it the reference numbers of Fig. 5 and the unit 31 has the same numbers with primes. Pressure has been applied from the control valve to the line 43 and the line 42 has been connected to the exhaust.

The pressure oil flowing into the right end of the cylinder 49 will have acted against the piston 60, and will have applied pressure to the right end of the valve 75. The resistance of the springs 80 and 81, and the springs 80' and 81', is greater than the normal resistance of the wipers and the mechanism in regular operation. For instance, the valves 75 and 75' may have a resistance of 250 p. s. i. Hence, the entire piston 60 will have moved to the left to the end of its stroke. When the piston is stopped, the resistance goes quickly beyond the 250 p. s. i., and the valve 75 will have been forced to the left, permitting oil to flow through the piston, into the line 44 and against the piston 60', moving it to the left, until it has reached the position shown in Fig. 22.

At this point the pressure again rises. It must be above 250 p. s. i. to have held the valve 75 open. When the piston 60' stops; the pressure begins to act upon the valve 75' against its additional resistance of 250 p. s. i.

From the pressure values assumed in the wiper unit springs, a resistance produced by the spring 149 in the control valve will be assumed to produce a resistance of 400 p. s. i. against displacement of the selector valve 110 from neutral position. Therefore, before the wiper valve 75' will be opened, which would require 500 p. s. i., as it is now in series with the valve 75, the selector valve 110 will be displaced, instituting a reversal of the control valve 32.

When the control valve reverses, the line 43 becomes an exhaust line, and pressure is applied to the line 42 to move the wipers back. At such time, the oil between the pistons, including that in the line 44, will remain practically undiminished. Therefore, both wipers will move back in synchronism. At the end of this reverse stroke, both valves 75 and 75' will be urged open simultaneously, offering their combined resistance of 500 p. s. i., and the control valve will again reverse.

During continued operation, the two valves 75 and 75' may open only as necessary to keep the oil supply between the pistons full.

The foregoing values are only typical. The critical factors are to have the combined ordinary operating resistances of the wipers plus that of all of the valves 75 except one, less than the resistance of the valve 110, but to have the combined resistance of all valves 75 and 75' greater than that of the valve 110. Pressures in values obviously means pressure differentials between the high pressure and low pressure sides.

It will be observed by referring to Fig. 5 that a dashpot action is provided at each end of the stroke of each piston. For example, as the piston 60 moves to the left in Fig. 5, at the end of its stroke, the projection 67 will begin its loose engagement in the smaller cylindrical portion 52. This will mean that a quantity of oil is retained between the cylinder head and the piston head, which is checked by the seating of the ball 56. This trapped oil can escape only around the loose fit of the portion 67 in the portion 52. Thus, a dashpot action is provided. This, of course, is relieved to permit the piston to move away from the cylinder head by the moving of the check ball 56 from its seat.

As has been noted, the plunger 89 is adapted to lock the pistons in either of their extreme positions. If the pistons are locked at the start of any cycle of operation, one of the slots 97 or 100 will be in registry with either port 96 or 99, respectively.

Assume the pistons are at the right as shown in Fig. 5. If upon restart, pressure returns through the line 43, it will flow through the port 96 to depress the plunger 89. It will also displace the valve 75, flow through the line 44, and act to depress the locking plunger in the other piston. After this has occurred, its further effort to displace the other valve 75 will result in reversal of the control valve. But the check valves will retain the oil against the plunger 89 so that they will be held down, and the supply of oil for such purpose is renewed at the end of each stroke.

If the start occurs with the pressure introduced to the right ends of the pistons (as in Fig. 5), oil will flow through the valves 75 of the rightmost piston, and then back to release its locking plunger, prior to displacing the other valve 75 to reverse the control valve. Reversal of the control valve introduces pressure to the left end of the other piston, which will unlock it. Finally, on an additional reversal, the wipers will start.

It is readily apparent how unlocking will occur if only one wiper is locked.

The relief groove 86 extends around the piston. It is always in communication with one of the ball valves, and thereby readily releases any pressure that might build up around the wiper shaft, as these valves have relatively light resistance. The disposition of the detent notches 87 and 88 in this groove prevents scraping of the cylinder by any burs on their edges that might be turned up by the detent plunger.

When the main speed control valve 34 is closed, the pressure acting against the piston 89 will gradually bleed around the upper part of the piston and through the opening in the top thereof to relieve itself through the line 40. Also pressure on one or the other sides of the piston 60 will gradually relieve itself around the piston and into the tube 40. When the piston 89 is relieved, it will move into one of the notches 87 or 88 and will lock the wipers in position until they are turned on again. This is a mechanical lock. It will be observed that this mechanical lock can be relieved whenever pressure is built up enough through one of the notches 97 or 100 to force back the piston. The resistances of the two pistons and two of the check valves are less than the pressure necessary to shift the selector valve.

An adjustment of the cut-off valve 34 alters the speed with which the various pressures can be built up, and, therefore, it varies the speed of operation of the entire mechanism.

If one of the wipers is blocked, as by slush or ice, the other will operate through its complete cycle, and the blocked one will operate through the sweep permitted by the obstruction. If both are blocked, they will sweep through the stroke permitted. This comes about because a blocking of one wiper unit limits the movement of its piston with the same effect on the pressures as if the piston had reached the end of its stroke. The resistance of the two units in series in whatever positions they are stopped will become greater than the displacing resistance of the selector valve, and the mechanism will reverse. It will also be seen that the wiper will strike against the obstruction with some force and may clear it away by repeatedly beating it.

If the wipers become desynchronized, they will always resynchronize. If an obstruction of one occurs, such as when 30 is moving to the right in Fig. 22, and when the connecting line 44 is filled with oil, the piston 60' will, nevertheless, move its full stroke even though the piston 60 be blocked. This will force some of the oil normally trapped within the line 44 through the valve 75. But it will be observed, that, at this time, the other valve 75' is not operating, so that the force required is the force to overcome only one of the valve resistances plus the force to move the piston. Not until the piston 60 reaches the end of its stroke, will both valves be put in series.

Thereafter, upon a reversal, the piston 60 will move more quickly to its left-hand extreme, but such motion will be insufficient to displace the quantity of oil required to move the piston 60' to its left-hand extreme owing to the previously mentioned reduction of oil between the two pistons. Then the valve 75 will be displaced until the piston 60' is moved to its left-hand limit. After this last situation is produced, the valve 75' will be put in series with the valve 75, and a reversal will occur, but, at this time, resynchronization has already occurred.

If one of the wipers becomes permanently blocked in a fixed position the other wiper will continue to operate through its full permitted stroke. Also, both wipers may operate on a limited stroke or one in a stalled, and the other on a limited stroke. In every case, resynchronization is automatic.

The number of wiper units used can be multiplied indefinitely. It is necessary only to have the total resistances of all of the valves 75 in series greater than the neutralizing force on the selector valve 110, but with any less than the total number less than the neutralizing force on the valve 110.

The mechanism can be used with one wiper, as the unit 30, in which case, when the piston 60 would stop, the control valve would shift. Advantages of operating a single wiper this way are that it would not require a full stroke to reverse itself, and that it would have the beating action tending to break down any obstructions to its cycling for its full sweep.

What is claimed is:

1. In a mechanism of the kind described, a plurality of windshield wiping units adapted to wipe back and forth, oppositely operable fluid pressure means including opposite fluid connections adapted to receive pressure oppositely for so operating them, means to connect said fluid pressure means in series in a reversible fluid pressure circuit, means to control the fluid pressure means to apply fluid under pressure thereto first in one direction and then in the other, each of said units including means to resist the fluid under pressure with a maximum resistance when the unit is stopped, and said control means being operable in response to the total maximum pressure resistances to reverse the flow of fluid under pressure when all of said units are stopped, but being inoperable to reverse the flow of such fluid when less than all of the units are stopped.

2. In a mechanism of the kind described, a plurality of wiper units, each unit having a fluid chamber within which is a power member adapted to move in opposite directions, fluid pressure means for controlling application of fluid under pressure to opposite sides of said power members to effect back and forth movement of the wiper units, said fluid pressure control means being operable upon existence of predetermined fluid pressure to reverse the flow of fluid under pressure from one side to the other of said power members, said fluid chambers being connected in series whereby fluid must pass from one to the other for operating the wipers, fluid flow resisting means normally preventing flow of fluid from one chamber to another, but resistingly permitting such flow, the resistance thereof being greater than the normal operating resistance of the unit, but less than the resisting pressure of the power member when stopped, and the sum of the resistances thereof for all the units being greater than the reversing force for operation of the control means, but the sum of less than all of said resistances being less than the reversing force necessary for operating the control means.

3. In a mechanism of the kind described, a wiper element including a pressure chamber, a pressure-responsive member in the chamber adapted to be displaced in opposite directions in the chamber in response to application of fluid under pressure to one end or the other of the chamber, means limiting movement of the member in each direction, a control mechanism adapted to control connection of the respective ends of the chamber with fluid under pressure, said control mechanism including displaceable means adapted to control reversal of the application of fluid under pressure from one end of the pressure chamber to the other and displaceable to inaugurate shifting of the application of fluid under pressure from one end of the chamber to the other, yieldable means resistably opposing displacement of said displaceable means, means subjecting the displaceable means to the fluid under pressure in the chamber, and said yieldable means providing resistance greater than the normal operating resistance of the pressure-responsive member, but less than the fluid pressure when the pressure-responsive member has stopped moving.

4. In a mechanism of the kind described, a plurality of fluid-pressure operated windshield wiper units, each including a cylinder and a piston therein, a tube connecting the chambers of said wiper units in series, by-pass means to permit flow of fluid from one chamber to the next, resistingly yieldable valve means controlling said by-pass means and operable upon existence of predetermined pressure conditions in the chamber, a control including a valve subjected to pressure into the chambers, resisting means adapted to hold against pressures as great as all but one of said resistingly yieldable by-pass valves but adapted to yield to pressures of all said by-pass valves in series, said resisting means being adapted to oppose displacement of the control valve, and the control valve, when displaced in response to such pressures, being adapted to institute a reversal of application of fluid under pressure from one end of said chambers to the other, to reverse the wiper units.

5. In a mechanism of the kind described, a windshield wiper unit including a cylinder and a piston oppositely displaceable therein, wiper mechanism operated by the piston, fluid passage means into opposite ends of the cylinder, means to introduce pressure fluid alternately into the ends of the cylinder to effect displacement of the piston, resisting by-pass means adapted to by-pass the fluid from one end to the other of the piston, including passage means between the ends of the cylinder and yieldable means resisting communication through the by-pass, whereby said by-pass means is adapted to introduce fluid from the first end into the second end, predetermined pressure in the fluid in the first end, the resistance of the by-pass means being greater than the operating resistance of the piston and parts displaced thereby.

6. In a mechanism of the kind described, a plurality of fluid pressure operated units, each including a cylinder, a piston oppositely displaceable therein, mechanism operated by movement of the piston in opposite directions, a port adapted to establish communication from one side of the piston to the other to introduce fluid from one side to the other, a valve controlling the port, yieldable means maintaining the valve in position to close the port, but yieldable to open the same upon application of predetermined pressure to either side thereof, the resistance of said yieldable means being greater than the normal resistance to displacement of the piston and mechanism operated thereby, means to connect the cylinders in series, and means to interpose the series in a pressure-reversing fluid pressure circuit.

7. In a mechanism of the kind described, a plurality of fluid pressure operated units, each including a cylinder, a piston oppositely displaceable therein, mechanism operated back and forth by reciprocation of the piston, a port through the piston from one side to the other thereof, a valve in the piston having a closing position with respect to the port, and being adapted for displacement in either direction to open said port, a spring on each side of the valve to resist its opening in each direction, the resistance afforded by each spring being greater than the normal operating resistance of the piston and mechanism operated thereby, means to connect the cylinders in series, and means to interpose the series in a pressure-reversing fluid pressure circuit.

8. In a windshield wiper mechanism, a windshield wiper unit comprising a chamber, a piston-like member movable in the chamber, a wiper element operated by the piston member, openings into the opposite sides of the chamber, a pressure control having a fluid pressure inlet and an outlet, a pair of fluid-pressure lines connected respectively to the opposite openings in the chamber, and pressure-responsive means selectively to connect one of said lines to the inlet and the other to the outlet and vice versa, said means comprising a directional valve adapted to be moved to effect connection of the first line to the inlet and the second to the outlet, and vice versa, said directional valve being adapted to be moved by application of pressure oppositely thereon, and selector valve means movable for admitting pressure selectively in one of two lines in accordance with the position of the selector valve means, said selector valve means being connected to receive the high pressure as it is applied to the fluid-pressure lines, for displacement thereof in accordance with pressure conditions of said lines, force means resisting displacement of the selector valve means, and permitting displacement of the selector valve means only when the pressure of the respective fluid-pressure line attains a predetermined value, and means responsive to the pressures in said two selector valve lines to effect shifting of the directional valve to its other position reversing pressure connections of said lines.

9. In a windshield wiper mechanism, a windshield wiper unit comprising a chamber, a piston-like member movable in the chamber, a wiper element operated by the piston member, openings into the opposite sides of the chamber, a pressure control having a fluid pressure inlet and an exhaust outlet, a pair of fluid-pressure lines connected respectively to the opposite openings in the chamber, and pressure-responsive means selectively to connect one of said lines to the inlet and the other to the outlet and vice versa, said means comprising a valve adapted to be moved to effect connection of the first line to the inlet and the second to the outlet, and vice versa, means controlling the position of said valve comprising mechanism movable in opposite directions from a neutral position in response to pressure changes oppositely acting thereon, yieldable means urging the same into neutral position, ports connecting opposite sides of the mechanism with the respective lines, whereby said mechanism responds to pressure conditions thereof, said yieldable means resisting displacement until the pressure in one of the lines receiving fluid under pressure attains a predetermined value, and means operated to reverse the valve upon displacement of the mechanism.

10. In a windshield wiper mechanism, a windshield wiper unit comprising a chamber, a piston-like member movable in the chamber, a wiper element operated by the piston member, openings into the opposite sides of the chamber, a pressure control having a fluid pressure inlet and an exhaust outlet, a pair of fluid-pressure lines connected respectively to the opposite openings in the chamber, and pressure-responsive means selectively to connect one of said lines to the inlet and the other to the outlet and vice versa, said means comprising a valve adapted to be moved to effect connection of the first line to the inlet and the second to the outlet, and vice versa, means controlling the position of said valve comprising mechanism movable in opposite directions from a neutral position in response to pressure changes oppositely acting thereon, yieldable means urging the same into neutral position, ports connecting opposite sides of the mechanism with the respective lines, whereby said mechanism responds to pressure conditions thereof, said yieldable means resisting displacement until the pressure in one of the lines receiving fluid under pressure attains a predetermined value, and means operated to reverse the valve upon displacement of the mechanism, said last-named means comprising a second valve operable into two positions, in one of which it connects one side of the first valve to pressure and the other side to exhaust, and vice versa in the second position, means operating the second valve to one position or the other in response to the operation of the mechanism from its neutral position one way or the other, and means insuring complete operation of the second valve by the time the first valve has shifted to effectively reduce the pressure acting to shift the mechanism.

11. In a windshield wiper mechanism, a windshield wiper unit comprising a chamber, a piston-like member movable in the chamber, a wiper element operated by the piston member, openings into the opposite sides of the chamber, a pressure control having a fluid pressure inlet and an exhaust, a pair of fluid pressure lines connected respectively to the opposite openings in the chamber, and means selectively to connect one line to the inlet and the other to exhaust, and vice versa, said means comprising a first valve displaceable to effect said connections selectively, and opposite pressure means adapted selectively for connection to fluid pressure or exhaust for displacement of said first valve, a second valve controlling said opposite pressure means of the first valve, the second valve being displaceable to connect selectively one side of said means to pressure and the other to exhaust, and vice versa, means restricting the fluid flow around said second valve to said opposite pressure means of the first valve to delay action of the latter, opposite fluid pressure means adapted selectively for connection to fluid pressure or exhaust for displacement of the second valve, a third valve having opposite pressure-responsive operating means connected to the fluid pressure lines and under control of the first valve, yieldable means urging the third valve into neutral position, said third valve being adapted to be displaced by admission of fluid under pressure to its opposite pressure means and building up of said pressure to predetermined values exceeding the resistance of said yielding means, said third valve, upon such displacement, being adapted to connect the pressure means of the second valve to pressure and exhaust to reverse the second valve, said connection being free to cause rapid movement of the second valve, whereupon the second valve more slowly effects reversal of the first, and the last-named valve reverses pressure conditions in the lines.

12. In a windshield wiper mechanism, a windshield wiper unit comprising a chamber, a piston-like member oppositely movable in the chamber, a wiper element operated by the piston-like member, openings into the opposite sides of the chamber, a pressure control having a fluid pressure inlet and an outlet, a pair of fluid-pressure lines connected respectively to the opposite openings into the chamber, and pressure-responsive means selectively to connect one of said lines to the inlet and the other to the outlet and vice versa, said means comprising a directional valve adapted to be moved to effect connection of the first line to the inlet and the second to the outlet, and vice versa, said directional valve being adapted to be moved by application of pressure oppositely thereon, and selector valve means movable for admitting pressure selectively in one of two lines in accordance with the position of the selector valve means, said selector valve means being connected to receive the high pressure as it is applied to the fluid-pressure lines, for displacement thereof in accordance with pressure conditions of said lines, force means resisting displacement of the selector valve means, and permitting displacement of the selector valve means only when the pressure in the respective fluid-pressure line and the side of the chamber connected therewith attains a predetermined value, and means responsive to the pressures in said two selector valve lines to effect shifting of the directional valve to its other position reversing pressure connections of said lines, said last means including a pilot valve interposed between the selector valve means and the directional valve, said pilot valve being movable from a position to admit high pressure to one side of the directional valve to a position to admit high pressure to the opposite side thereof, said pilot valve being also connected to be oppositely moved by the high pressure received from the selector valve, and means to insure full movement of the pilot valve before the directional valve reaches the end of its movement.

13. In a mechanism of the kind described, a plurality of fluid pressure operated units, each including a cylinder, a piston oppositely displaceable therein, mechanism operated by movement of the piston in opposite directions, a port adapted to establish communication from one side of the piston to the other to introduce fluid from one side to the other, said port comprising a passage of predetermined length, a valve controlling the port, said valve comprising a slidable member having a shape conforming to that of said port, a notch extending from one end of the valve toward the other but terminating short of the said other end, a similar notch extending from said other end toward said one end, but terminating short of the same, whereby when said valve is in a mid-position the port is closed, and when it is displaced in either direction the port is opened, yieldable means maintaining the valve in position to close the port, but yieldable to open the same upon application of predetermined pressure to either side thereof, the resistance of said yieldable means being greater than the normal resistance to displacement of the piston and mechanism operated thereby, means to connect the cylinders in series, and means to interpose the series in a pressure-reversing fluid pressure circuit.

14. In a mechanism of the kind described, a plurality of units adapted to operate back and forth between normal limits, means to apply a force to operate said units in series, each of said units offering a resistance to movement that increases when the unit is stopped, said force-applying means including a reversing mechanism through which the force is transmitted to the units in series, said reversing mechanism including force-responsive means to effect reversal of the force, said force-responsive means having a resistance means with a resistance greater than all but one of the units stopped, but less than that of all of the units stopped.

15. In a windshield wiper mechanism, a windshield wiper unit including a chamber having a piston-like member therein, a wiper unit connected to the piston-like member, a reversing mechanism for use with a high fluid pressure line and a low fluid pressure line, a first and a second port connected with the opposite ends of the chamber and adapted to be respectively connected to the high and the low pressure lines, and vice vesra, a directional valve movable to determine which of the connections shall be made, a pilot valve movable for controlling movement of the directional valve, means responsive to pressure in the port connected with high pressure, to effect movement of the pilot valve to reverse the position of the directional valve upon attainment of a predetermined pressure in the high pressure port and the side of the chamber communicating therewith, and means to insure full movement of the pilot valve by the time the directional valve has moved.

16. In a windshield wiper mechanism, a wiper unit having a chamber and a piston-like member therein, the chamber having openings on opposite sides of the member, a wiper unit operated by the piston-like member, a pressure control having a fluid pressure inlet and an exhaust, a pair of fluid pressure ports connected respectively to the opposite openings of the wiper unit chamber, and means selectively to connect one port to the inlet and the other to exhaust, and vice versa, said means comprising a first valve displaceable to effect said connections selectively, and opposite pressure means adapted selectively for connection to fluid pressure or exhaust for displacement of said first valve, a second valve for controlling said opposite pressure means of said first valve, the second valve being displaceable to connect selectively one side of said means to pressure and the other to exhaust, and vice versa, means restricting the fluid flow around said second valve to said opposite pressure means of the first valve to delay movement of the latter, opposite fluid pressure means adapted selectively for connection to fluid pressure or exhaust for displacement of the second valve, fluid pressure responsive means to connect the opposite pressure means of the second valve to pressure and exhaust, respectively, and to reverse said connections, said connections for operation of the second valve being relatively unrestricted to insure full operation thereof at least by the time the first valve has been moved.

17. In a windshield wiper, a wiper unit having a chamber and a piston-like member therein, the chamber having openings on opposite sides of the member, a wiper unit operated by the piston-like member, a pressure control having a fluid pressure inlet and an exhaust, a pair of fluid pressure ports connected respectively to the opposite openings of the wiper unit chamber, and means selectively to connect one port to the inlet and the other to exhaust, and vice versa, said means comprising a first valve displaceable to effect said connections selectively, and opposite pressure means adapted selectively for connection to fluid pressure or exhaust for displacement of said first valve, a second valve for controlling said opposite pressure means of said first valve, the second valve being displaceable to connect selectively one side of said means to pressure and the other to exhaust, and vice versa, means restricting the fluid flow around said second valve to said opposite pressure means of the first valve to delay movement of the latter, opposite fluid pressure means adapted selectively for connection to fluid pressure or exhaust for displacement of the second valve, fluid pressure responsive means connected to said fluid pressure ports whereby to operate when the fluid pressure in the port connected with high pressure attains a predetermined value, and passage means valved by the fluid pressure responsive means for selectively connecting one of the opposite pressure means of the second valve to high pressure and the other to low pressure, and vice versa, whereby the second valve will be moved upon attainment of the predetermind pressure in the high pressure port, and means to prevent movement of the first valve to relieve the high pressure port until the second valve has been moved.

18. In a mechanism of the kind described, a plurality of reversible operating units, each unit having a fluid chamber within which is a power member adapted to move in opposite directions, fluid presssure means for controlling application of fluid under pressure to opposite sides of said power members to effect back and forth movement of the units, said fluid pressure control means being operable upon existence of predetermined fluid pressure to reverse the flow of fluid under pressure from one side to the other of said power members, said fluid chambers being connected in series whereby fluid must pass from one to the other for operating the units, fluid flow resisting means normally preventing flow of fluid from one chamber to another, but resistingly permitting such flow, the resistance thereof being greater than the normal operating resistance of the unit, but less than the resisting pressure of the power member when stopped, and the sum of the resistances thereof for all the units being greater than the reversing force for operation of the control means, but the sum of less than all of said resistances being less than the reversing force necessary for operating the control means.

19. In a mechanism of the kind described, a plurality of fluid-pressure operated reversible units, each including a chamber and a piston therein, a tube connecting the chambers of said units in series, by-pass means to permit flow of fluid from one chamber to the next, resistingly yieldable valve means controlling said by-pass means and operable upon existence of predetermined pressure conditions in the associated chamber, a control including a valve subjected to pressure admitted into the chambers, resisting means adapted to hold against pressures as great as all but one of said resistingly yieldable by-pass valves but adapted to yield to pressures of all said by-pass valves in series, said resisting means being adapted to oppose displacement of the control valve, and the control valve, when displaced in response to such pressures, being adapted to institute a reversal of application of fluid under pressure from one end of said chambers to the other, to reverse the units.

20. In a mechanism of the kind described, a plurality of wiper units comprising resisting but yieldable pressure-receiving elements inserted in series in a pressure line, and oppositely movable in response to pressure applied from opposite ends of the line, said elements having greater resistance when stopped than when moving, a resistance-responsive control means to cause application of pressure to the elements in series, first in one direction and then in the other, to operate the wiper units back and forth through a given maximum cycle, said means including reversing means operable in response to resistance of all units stopped, but inoperable to effect reversal in response to resistance of less than all units, and said control being thereby adapted to operate all units until all are stopped, whether or not at the end of their strokes, and then to reverse them.

21. In a mechanism of the kind described, a windshield wiper unit including a chamber and a piston-like member movable back and forth therein, wiper mechanism operated by the member, a fluid connection into the chamber on each side of the piston-like member, whereby fluid under relatively high pressure may be alternately introduced into the opposite sides of the chamber to move the piston-like member and wiper mechanism, pressure-resisting by-pass means supplemental to the fluid connections, adapted to by-pass the fluid under pressure from one side to the other of the piston-like member, including passage means between the ends of the chamber, and yieldable means resisting flow through the passage means, whereby said by-pass means is adapted to admit fluid from the high pressure side to the low pressure side of the piston upon existence of a predetermined pressure condition in the fluid, the resistance of the yieldable means being greater than the normal operating resistance of the piston-like member and the parts displaced thereby.

22. In a mechanism of the kind described, a windshield wiper unit including a chamber and a piston-like member movable back and forth therein, wiper mechanism operated by the member, a fluid connection into the chamber on each side of the piston-like member, whereby fluid under relatively high pressure may be alternately introduced into the opposite sides of the chamber to move the piston-like member and wiper mechanism, pressure-resisting by-pass means supplemental to the fluid connections, adapted to by-pass the fluid under pressure from one side to the other of the piston-like member, including passage means between the ends of the chamber, yieldable means resisting flow through the passage means, whereby said by-pass means is adapted to admit fluid from the high pressure side to the low pressure side of the piston upon existence of a predetermined pressure condition in the fluid, the resistance of the yieldable means being greater than the normal operating resistance of the piston-like member and the parts displaced thereby, and control means for alternatively controlling the introduction of fluid under pressure to the opposite sides of the chamber, including a fluid pressure-responsive reversing device subjected to the pressure of the operating fluid operable to reverse the pressure application from one side to the other when the high fluid pressure rises by stoppage of the piston-like member to a predetermined value.

23. A windshield wiper unit comprising a cylinder ported at opposite ends, a piston reciprocable in the cylinder, the piston having a passage therethrough, valve means to close said passage, said valve means being adapted to be subjected to fluid under pressure from either side of the piston, yieldable force means acting on said valve means to prevent opening of the passage by high fluid pressure on either side of the piston, until such pressure attains a predetermined value, and power take-off means adapted to operate a wiper from the piston.

HOWARD E. ROSE.

REFERENCES CITED

The following references are of record in the file of this patent:

UNITED STATES PATENTS

| Number | Name | Date |
|---|---|---|
| 885,459 | Engler | Apr. 21, 1908 |
| 1,268,912 | Baader | June 11, 1918 |
| 1,569,143 | Robinson | Jan. 12, 1926 |
| 1,677,860 | Ferris | July 17, 1928 |
| 1,952,690 | Strom | Mar. 27, 1934 |
| 2,033,839 | Lawson | Mar. 10, 1936 |
| 2,060,684 | Moorhouse | Nov. 10, 1936 |
| 2,100,445 | Le Bleu | Nov. 30, 1937 |
| 2,221,313 | Lawrence | Nov. 12, 1940 |
| 2,266,867 | Hume | Dec. 23, 1941 |
| 2,270,943 | Freundel | Jan. 27, 1942 |
| 2,298,457 | Berges | Oct. 13, 1942 |
| 2,302,232 | MacNeil | Nov. 17, 1942 |
| 2,370,376 | Snell | Feb. 27, 1945 |